United States Patent
Orr

(10) Patent No.: US 6,334,749 B1
(45) Date of Patent: Jan. 1, 2002

(54) LOCKING NAIL HOLDER TO BE USED WITH CONNECTOR ELEMENTS

(76) Inventor: Tom Orr, 523 S. 14th, Coerd 'Alene, ID (US) 83814

( * ) Notice: Subject to any disclaimer, the term of this patent is extended or adjusted under 35 U.S.C. 154(b) by 0 days.

(21) Appl. No.: 09/758,353

(22) Filed: Jan. 12, 2001

Related U.S. Application Data

(63) Continuation-in-part of application No. 09/411,318, filed on Oct. 4, 1999, now Pat. No. 6,174,119.

(51) Int. Cl.[7] ................................................ F16B 15/00
(52) U.S. Cl. ....................... 411/461; 411/386; 411/441; 411/469; 411/999
(58) Field of Search .................................. 411/386, 441, 411/457, 461–465, 469, 970, 999; 403/11, 12

(56) References Cited

U.S. PATENT DOCUMENTS

| | | | | |
|---|---|---|---|---|
| 2,389,344 A | * | 11/1945 | Constance | 411/999 X |
| 4,296,520 A | * | 10/1981 | Arndt | 403/12 X |
| 5,178,503 A | * | 1/1993 | Losada | 411/441 |
| 5,314,160 A | * | 5/1994 | Larsen | 411/441 |
| 5,634,756 A | * | 6/1997 | Losada | 411/441 |

* cited by examiner

*Primary Examiner*—Neill Wilson
(74) *Attorney, Agent, or Firm*—Tom Hamill Jr.

(57) ABSTRACT

A connector having apertures to be used to secure different pieces of construction material in relation to each other is provided with structure to hold a nail thereto. This structure permits the nail to be brought into selective alignment with the aperture allowing the nail to be driven home without the workman holding the nail. The invention includes aperture engagement structure which is located in the aperture of the connector. The nail is held in a fastener engagement structure, which has the structure of a sleeve. The fastener engagement structure is attached to the aperture engagement structure on their common first side by a hinge. The fastener engagement structure further has a male portion located on its second side. The aperture engagement structure further has a female portion located on its second side. In a first configuration, the nails are held flat against the body of the connector. When it is desired to drive the nail, the user rotates one or more of the nails into a second, upright position about the hinge. In this second position the male portion engages the female portion causing the fastener engagement structure and the aperture engagement structure to be locked together. This aligns the nail with the aperture present on the connector. Once the sleeve is locked in the upright position the user then drives the nail through the aperture securing the connector to the construction material. The sleeve may include a corrugated interior to assist in gripping the nail more firmly in place. Also, the sleeve may be scored so that when the nail is driven, the sleeve splits and falls out of the way.

7 Claims, 3 Drawing Sheets

FIG. 4
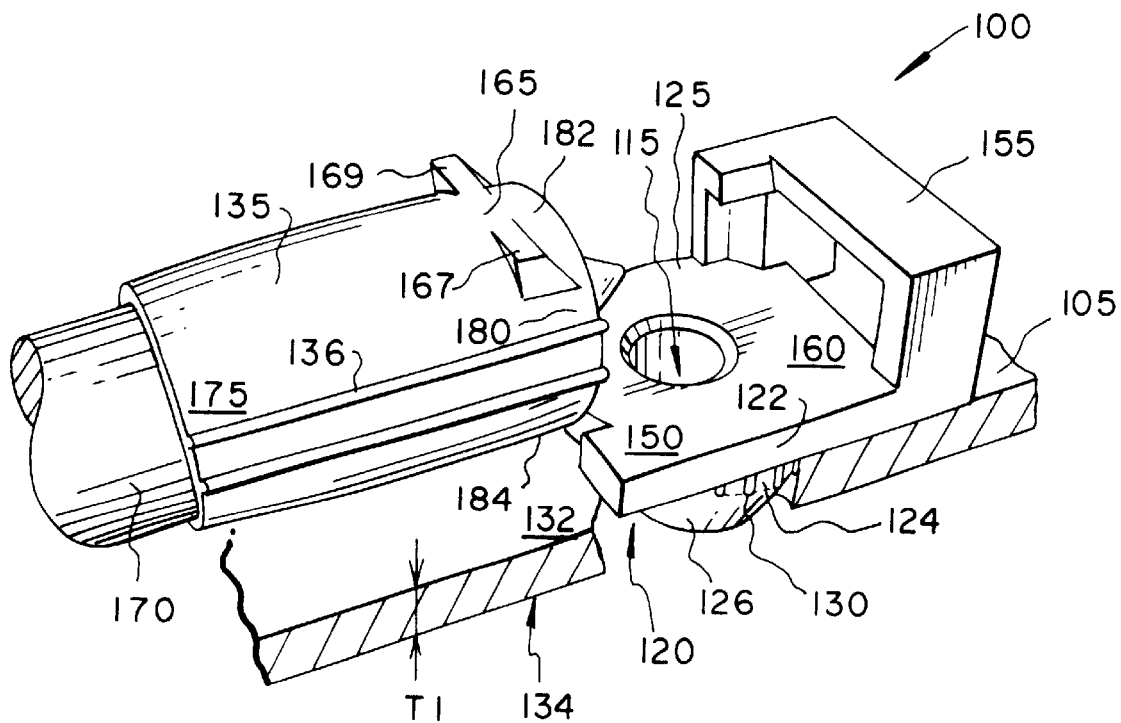
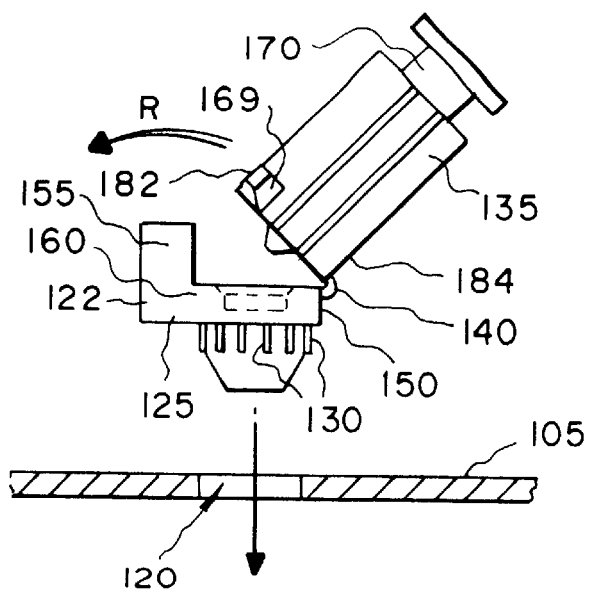
FIG. 5

LOCKING NAIL HOLDER TO BE USED WITH CONNECTOR ELEMENTS

This application is a continuation in part of patent application Ser. No. 09/411,318 filed Oct. 4, 1999, now U.S. Pat. No. 6,174,119.

BACKGROUND OF THE INVENTION

1. Field of the Invention

The invention relates to a connector which includes a plurality of apertures through which nails would be driven through in order to secure separate pieces of building material together. More specifically, the invention relates to a connector wherein structure is provided to secure a nail thereto and to permit the nail to be brought selectively into alignment with the aperture and locked into position prior to it being driven home.

2. Description of the Prior Art

Two of the most common connectors used in construction are the joist hanger and the hurricane clip. The first of these is used to connect a joist or rafter to a beam, ledger, wall, or the like, and the second is used to connect the base of a roof truss to the plate to prevent the roof from lifting under a high wind load. These connectors are well known on any construction site. The above mentioned connectors, as well as a variety of other types of connectors, are secured to the building materials by a plurality of nails driven through apertures present in the connectors. Positioning these nails above the aperture and then driving them home is difficult and often the workman would drop the nail or possibly would strike his finger or hand with the hammer. This is inefficient at best and painful at worst.

The applicant has addressed this problem in his prior patent application, Ser. No. 09/411,318. In that application, the nails are self-positioning, that is integral with the connector so that the installer only needs to move or flip the nail into position, and then hammer the nail home. The nail is held in the correct position by a sleeve that then may serve as a type of bushing to completely fill the aperture when the nail is driven completely in.

The instant invention provides some of the same structure but further includes locking means to keep the nail in alignment with the aperture. The locking means includes a male portion on the fastener engagement means and a female portion on the aperture engagement means. When the fastener engagement means is rotated about the hinge, the nail (fastener) comes into alignment with the aperture. At this point, the male portion matingly engages the female portion and secures the fastener engagement means with the aperture engagement means.

Thus, while some of the structure of the instant invention is shown in the parent application of this case, it was not contemplated to have means to lock the fastener engagement means atop the aperture engagement means. The locking means to secure the fastener engagement means atop the aperture engagement means allows the workman enhanced ease in the installation of these connectors on a construction or other work site, providing a "hand-free" environment that speeds installation time, prevents injury, and saves in labor costs.

SUMMARY OF THE INVENTION

A mechanical connector having apertures to be used to secure different pieces of construction material in relation to each other is provided with structure to hold a nail thereto. This structure further permits the nail to be brought into selective alignment with the aperture allowing the nail to be driven home without the workman holding the nail. The invention includes an aperture engagement structure which is provided in the aperture of the connector. The nail is held in a fastener engagement structure, which has the structure of a sleeve. The fastener engagement structure is attached to the aperture engagement structure on their common first side by a hinge. The fastener engagement structure further has a male portion located on its second side. The aperture engagement structure further has a female portion located on its second side. In a first configuration, the nails are held flat against the body of the connector. When it is desired to drive the nail, the user rotates one or more of the nails into a second, upright position about the hinge. In this second position the male portion engages the female portion causing the fastener engagement structure and the aperture engagement structure to be locked together. This aligns the nail with the aperture present on the connector. Once the sleeve is locked in the upright position the user then drives the nail home. The sleeve may include a corrugated interior to assist in gripping the nail more firmly in place. Also, the sleeve may be scored so that when the nail is driven, the sleeve splits and falls out of the way.

Another contemplated embodiment of the invention is one in which a number of the flexible nail retainers are attached together such that when the user moves them into the upright position, all the nails are aligned with their respective apertures on the connector. This would permit one movement to set up all of the nails at once on the connector.

The flexible nail retainers can be made of a variety of materials, such as plastic or metal and may further include a press fit clip, rivet, or the like incorporated into the aperture.

Thus it is an object of the invention to provide a connector that includes a flexible nail retainer for all the nails required to attach the connector to its various building components.

It is an object of the invention to provide an aperture engagement means to be fitted on the apertures of the connector.

It is an object of the invention to provide a hinge, the hinge connecting the first side of the fastener engagement means to the first side of the aperture engagement means.

It is an object of the invention to provide a male portion on the second side of the fastener engagement means.

It is an object of the invention to provide a female portion on the second side of the aperture engagement means.

It is an object of the invention whereby the male portion matingly engages the female portion when the fastener engagement means is rotated about the hinge, (bringing the nail into selective alignment with an aperture) locking the fastener engagement means atop the aperture engagement means.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 4 is a view of the second embodiment of the present invention, in its first position.

FIG. 5 is a view of the second embodiment of the invention being rotated into its second position.

DESCRIPTION OF THE PREFERRED EMBODIMENT

Figure 1:
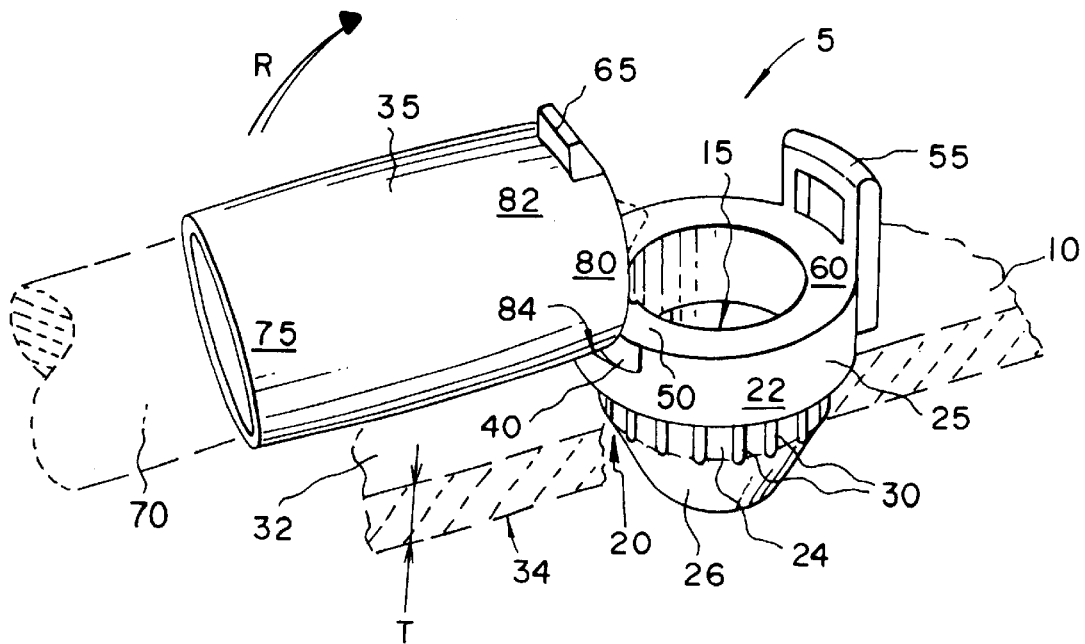
FIG. 1 is a view of the first embodiment of the present invention, in its first position.
Figure 2:
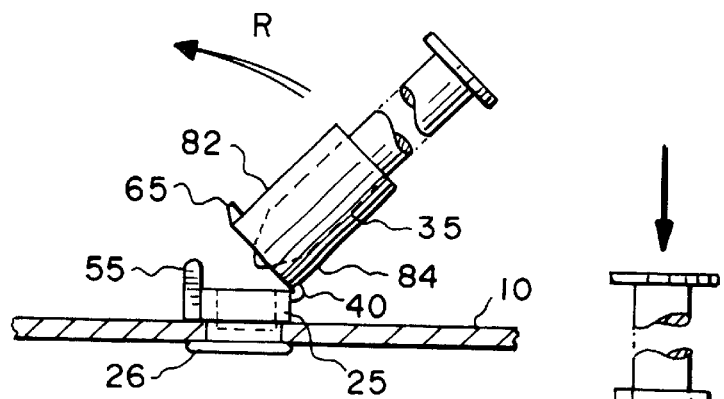
FIG. 2 is a view of the first embodiment of the invention being rotated into its second position.
Figure 3:
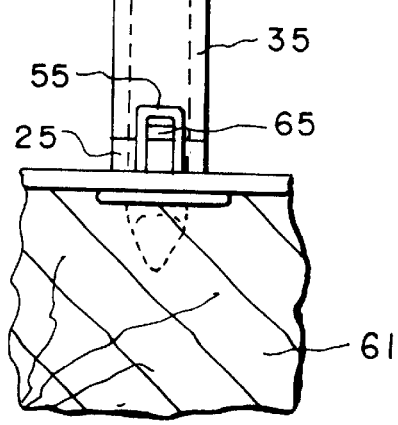
FIG. 3 is a view of the first embodiment of the invention in its second position, with the locking means secured.

Referring to FIGS. 1–3, the nail holding structure of the invention 5 is shown employed on a connector 10. The connector 10 includes aperture 20. The connector 10 is of the type which may include a plurality of apertures 20 thereon and in this case, a plurality of the nail holding structures are provided connected to each one of the apertures.

The connector aperture 20 has an aperture engagement structure 25. The aperture engagement structure 25 is connected to a fastener engagement structure 35 by a living hinge 40.

The aperture engagement structure 25 may be frictionally engaged to the connector aperture 20 by a plurality of ribs 30. These ribs or splines 30 may permit the aperture engagement structure 25 to be more easily placed in the aperture 20. Other means to affix the aperture engagement structure 25 to the connector aperture 20 may be provided. Such means may include a portion of the plastic being hot melted to the underside, middle or top of the aperture of the connector, adhering the aperture engagement structure 25 to the connector aperture 20.

The aperture engagement structure 25 geometry is chosen to fit the geometry of the connector aperture 20. The aperture engagement structure 25 includes an upper portion 22, an intermediate portion 24 and a lower portion 26. The upper portion 22 resides above the upper surface 32 of the connector 10, the intermediate portion 24 resides within the thickness T of the connector 10 and the lower portion 26 resides beneath the lower surface 34 of the connector 10. The upper portion 22 may take on the general geometric appearance of the connector aperture 20, in this case a cylinder. The cylinder includes a central aperture 15 which passes through the center of the aperture engagement structure 25. The upper portion 22 includes a living hinge 40 located on a first side 50 and a female connector element 55 is located on a second side 60. The female connector 55 is configured to receive a male connector 65 therein. The male connector 65 is located on the fastener engagement structure 35.

The fastener engagement structure 35 is an elongated cylinder designed to slidingly receive a fastener 70 therein.

The fastener 70 may include, but is not limited to, a nail, a screw, a spike or the like. The fastener engagement structure 35 includes an upper portion 75 and a lower portion 80. The lower portion 80 has a first side 82 and a second side 84. The living hinge 40 is located on the lower portion first side 82 and is located on the lower portion second side 84 which is directly across from the male connector 65.

When the fastener engagement structure 35 is rotated in direction R about living hinge 40, it brings the fastener engagement structure 35 into vertical relation with the aperture engagement structure 25. At this point, the male connector 65 matingly interfits with the female connector element 55, locking the fastener engagement structure 35 securely in vertical relation above the aperture engagement structure 25. The nail 70 is then retained in vertical relation above the aperture 20 of the connector 10. This obviates the requirement for the nail 70 to be held by the hand of the worker who would be hammering the nail through the connector 10 into the construction material 61. At this point, the nail 70 (or other fastener) may be driven through the fastener engagement structure 35 (cylinder), through the central aperture 15 and then through connector aperture 20 and then into the construction material. The nail 70 will deform and break away both the fastener engagement structure and the aperture engagement structure as it is being hammered through the connector aperture.

Figure 6:
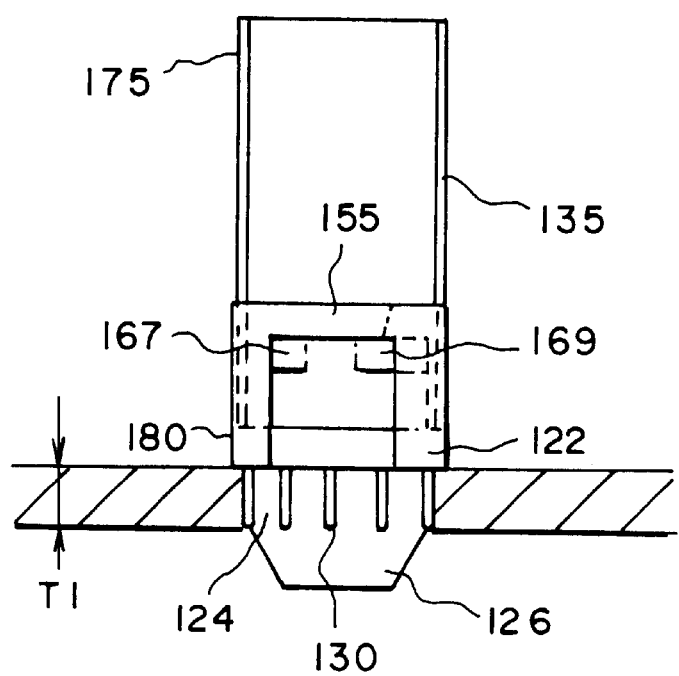
FIG. 6 is a view of the second embodiment of the invention in its second position with the locking means secured.

Referring to FIGS. 4–6, the nail holding structure of the invention 100 is shown employed on a connector 105. The connector 105 includes aperture 120. The connector 105 is again of the type which may include a plurality of apertures thereon and in this case, a plurality of the nail holding structures are provided connected to each one of the apertures.

The connector aperture 120 has an aperture engagement structure 125. The aperture engagement structure 125 is connected to a fastener engagement structure 135 by a living hinge 140.

The aperture engagement structure 125 may be frictionally engaged to the connector aperture 120 by a plurality of ribs 130. Other means to affix the aperture engagement structure 125 to the connector aperture 120 may be provided.

The aperture engagement structure 125 geometry is chosen to fit the geometry of the connector aperture 120. The aperture engagement structure 125 includes an upper portion 122, an intermediate portion 124 and a lower portion 126. The upper portion 122 resides above the upper surface 132 of the connector 100, the intermediate portion 124 resides within the thickness T1 of the connector 100 and the lower portion 126 resides beneath the lower surface 134 of the connector 100. The upper portion 122 may take on the general geometric appearance of the connector aperture 120, in this case generally circular or cylindrical. The upper portion 122 further may be tapered 121 toward the center in order to guide the fastener 170 into the connector aperture 120 when driven.

The cylinder includes a central aperture 115 which passes through the center of the aperture engagement structure 125. The upper portion 122 includes a living hinge 140 located on a first side 150 and a female connector element 155 is located on a second side 160. The female connector 155 is configured to receive a male connector 165 therein. The male connector 165 has a right side protrusion 167 and a left side protrusion 169. The male connector 165 is located on the fastener engagement structure 135.

The fastener engagement structure 135 is an elongated cylinder designed to slidingly receive a fastener 170, such as a nail therein. The fastener 170 may include, but is not limited to, a nail, a screw, a spike or the like. The fastener engagement structure 135 includes an upper portion 175 and a lower portion 180. The lower portion 180 has a first side 182 and a second side 184. The living hinge 140 is located on the lower portion first side 182 and is located on the lower portion second side 184 which is directly across from the male connector 165.

The fastener engagement structure 135 may further include structure such as ribs or lines of weakness which would permit the fastener engagement structure 135 to fracture when the fastener 170 is driven into the construction material.

When the fastener engagement structure 135 is rotated in direction R about living hinge 140, it brings the fastener engagement structure 135 into vertical relation with the aperture engagement structure 125. At this point, the male connector 165 matingly interfits with the female connector element 155, locking the fastener engagement structure 135 securely in vertical relation above the aperture engagement structure 125. The nail 170 is then retained in vertical relation above the aperture 120 of the connector 100. This obviates the requirement for the nail 170 to be held by the hand of the worker who would be hammering the nail through the connector 100 into the construction material. At this point, the nail 170 (or other fastener) may be driven through the fastener engagement structure 135 (cylinder), through the central aperture 115 and then through connector aperture 120 and then into the construction material. The nail 170 will deform and break away both the fastener engagement structure 135 and the aperture engagement structure 125 as it is being hammered through the connector aperture 120.

Figure 7:
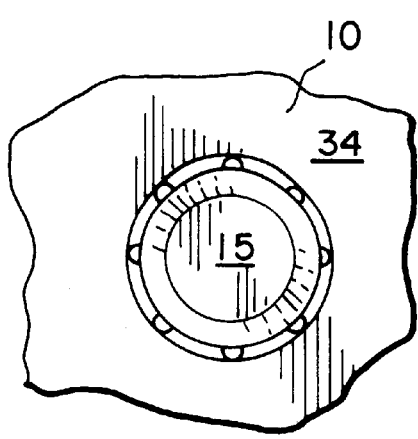
FIG. 7 is a bottom view of a circular aperture engagement structure.

FIG. 7 is a bottom view of a circular aperture engagement structure. The lower surface 34 of connector 10 as well as the central aperture 15 is shown. The circular structure is chosen to fit the geometry of the aperture present on the connector 10. The overall shape may be chosen to accommodate different fasteners as well as part handling by manufacturing equipment.

Figure 8:
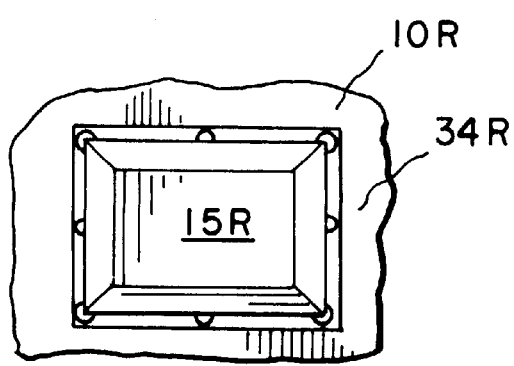
FIG. 8 is a bottom view of a rectangular aperture engagement structure.

FIG. 8 is a bottom view of a rectangular aperture engagement structure. The lower surface 34R (rectangular) of connector 10R as well as the central aperture 15 is shown. The rectangular structure is chosen to fit the geometry of the aperture present on the connector 10. The overall shape may be chosen to accommodate different fasteners as well as part handling by manufacturing equipment.

Figure 9:
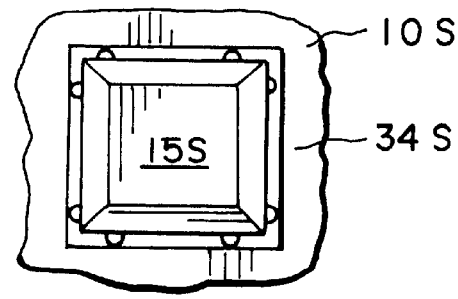
FIG. 9 is a bottom view of a square aperture engagement structure.

FIG. 9 is a bottom view of a square aperture engagement structure. The lower surface 34S (square) of connector 10S as well as the central aperture 15S. The square structure is chosen to fit the geometry of the aperture present on the connector 10S. The overall shape may be chosen to accommodate different fasteners as well as part handling by manufacturing equipment.

It is apparent from the above that the present invention accomplishes all of the objectives set forth by providing a locking means for securing a fastener above an aperture located in a connector which permits the fastener to be easily hammered in.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

I claim:

1. A fastener retaining and guiding apparatus for a connector having at least one aperture, comprising:

aperture engagement means;

fastener engagement means; and a hinge located between said aperture engagement means and said fastener engagement means;

locking means, whereby a fastener is engaged by said fastener engagement means, and an aperture on said connector is engaged by said aperture engagement means, and said fastener may be brought selectively into alignment with said aperture by said hinge and locked in place such that said fastener may be driven through said aperture by the user.

2. The fastener retaining and guiding apparatus according to claim 1, said fastener engagement means comprising a generally cylindrical tube configured to retain a nail.

3. The fastener retaining and guiding apparatus according to claim 1, wherein said hinge includes a living hinge.

4. A fastener retaining and guiding apparatus for a connector as claimed in claim 1, wherein said locking means includes a male member on said fastener engagement means and a female member on said aperture engagement means, whereby said male member is received and secured in said female member when said fastener engagement means is rotated perpendicularly to the plane of said connector.

5. The fastener retaining and guiding means according to claim 1, wherein said connector is a joist hanger.

6. The fastener retaining and guiding means according to claim 1, wherein said connector is a hurricane clip.

7. The fastener retaining and guiding means according to claim 1 wherein said connector is of the type designed to connect building materials together.

* * * * *